United States Patent Office 3,427,619
Patented Feb. 11, 1969

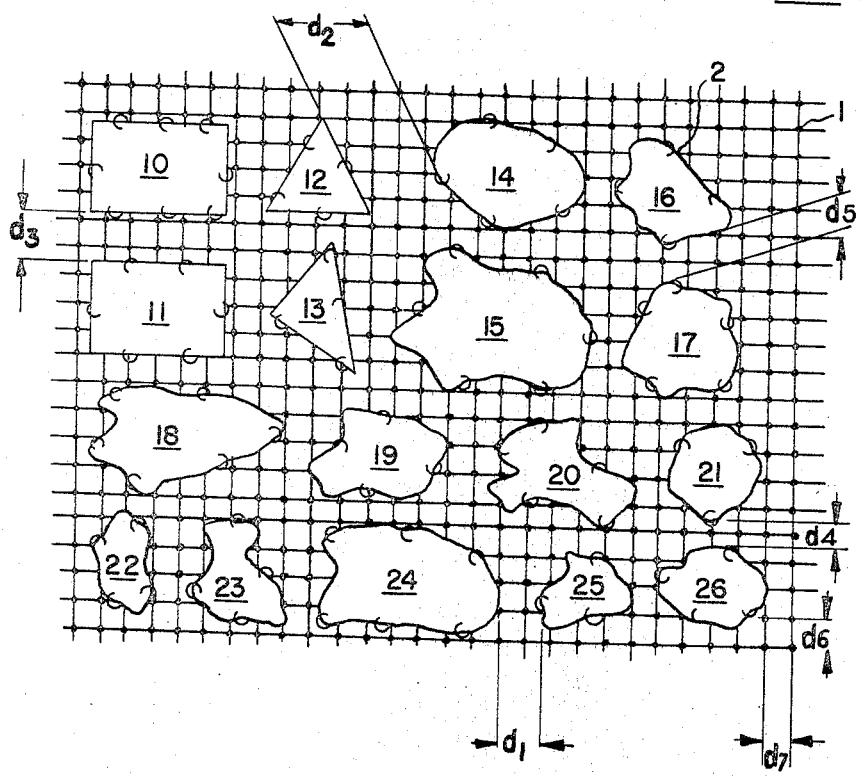
FIG.1
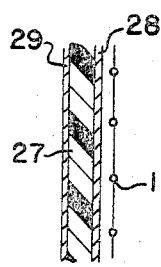
FIG.2
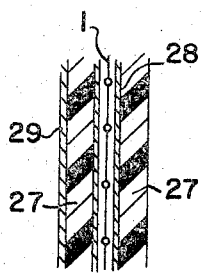
FIG.3
FIG.4

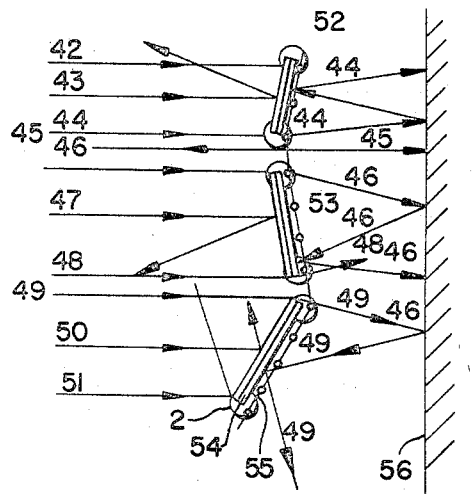
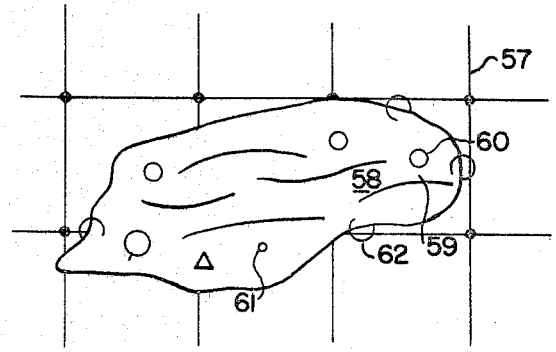
FIG.5  FIG.6
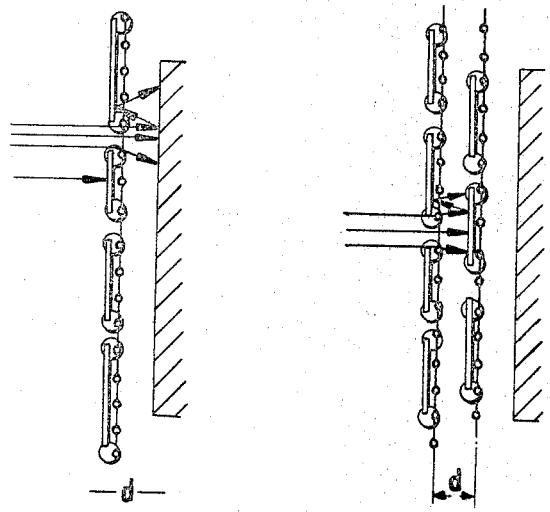
FIG.10  FIG.7

3,427,619
RADAR CAMOUFLAGING NET
Ludwig Wesch, Heidelberg, and Gerhard Beck, Frorup, Flensburg, Germany, assignors to Eltro G.m.b.H., Heidelberg, Germany
Continuation-in-part of application Ser. No. 575,274, Aug. 26, 1966. This application May 24, 1967, Ser. No. 648,521
Claims priority, application Germany, Sept. 2, 1965, E 30,031
U.S. Cl. 343—18            10 Claims
Int. Cl. G01s 7/36, 7/42; H01q 17/00

ABSTRACT OF THE DISCLOSURE

A radar camouflaging net with a plurality of absorbers, the dimension of, and the spacing between, the wave absorbing surfaces thereof being between 1/10th and ten times the average wavelength, and the surfaces being of different shape.

Cross-reference

This is a continuation-in-part of our copending application Ser. No. 575,274, now abandoned, filed Aug. 26, 1966.

Background and summary of the invention

The present invention relates to camouflaging nets for absorbing electromagnetic waves, and more particularly for absorbing waves in the range of infrared and centimeter wavelengths.

It is the primary object of this invention to provide camouflaging nets having improved weight characteristics and wave attenuation properties, wherein wave absorption and diffraction phenomena are combined.

This and other objects are accomplished by fixing a plurality of wave absorbers to a flexible support in spaced-apart relationship. The flexible support permits passage of at least a portion of the waves within the frequency range to be absorbed. The dimension of the wave absorbing surfaces of the absorbers in any direction and the spacing between the wave absorbing surfaces in any direction is between $\lambda_0/10$ and $10\lambda_0$, the average spacing of all distances between the absorbing surfaces not exceeding about $5\lambda_0$, wherein $\lambda_0$ is the average wavelength in free space of the waves to be absorbed in the range of centimeter wavelengths. The wave absorber surfaces are of different shape.

Brief description of the drawing

The above and other objects and features of the invention will become more fully understood by reference to the following detailed description of certain preferred embodiments thereof, taken in conjunction with the accompanying drawing wherein:

FIG. 1 is a plan view of a camouflaging net according to this invention;

FIGS. 2 to 4 are cross sections of a portion of such a camouflaging net with different embodiments of absorbers;

FIG. 5 schematically illustrates an arrangement of such a camouflaging net over an object to be camouflaged;

FIG. 6 is a plan view illustrating another embodiment of absorber;

FIGS. 7 and 10 show different arrangements of camouflaging nets over an object to be camouflaged.

Detailed description

Figure 8:
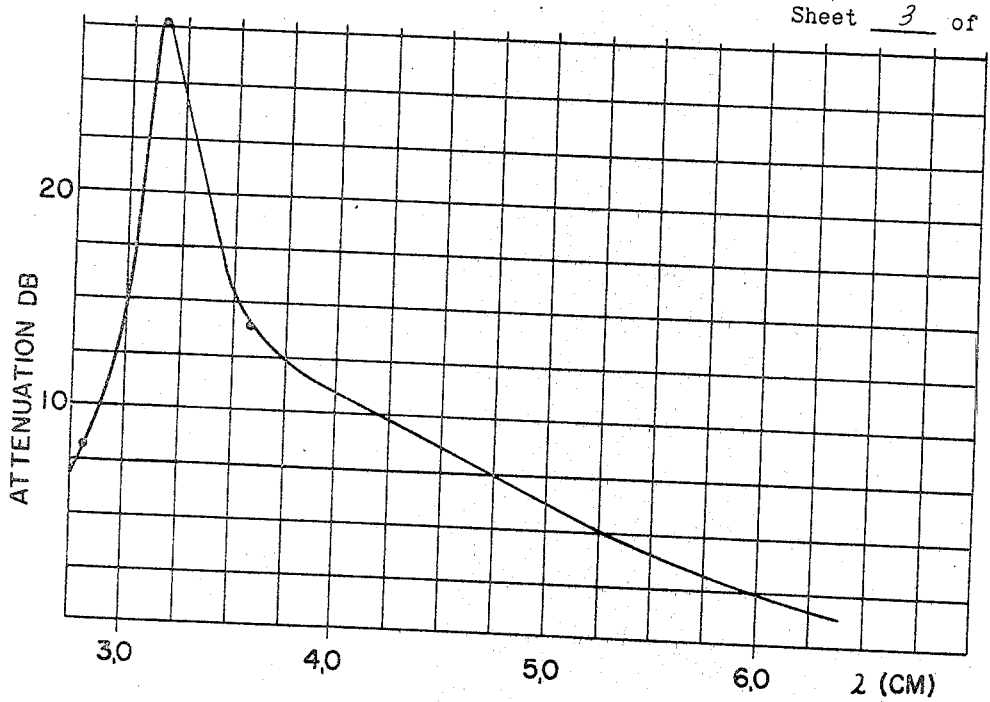
FIGS. 8, 9, 11 and 12 show graphs of wave attenuation curves of camouflaging nets according to the present invention.

Referring now to the drawing, and first to FIG. 1, there is shown a supporting net 1 having open meshes defined between the knots of the net, the strength of the net material and of the knots depending on the loads and/or the wearing properties desired. A preferred material for the net is synthetic yarn, for instance of nylon or other synthetic resin, although metallic wires may also be used for special cases, in which case the mesh size of the net must be relatively large in respect to the maximum wavelength of the impinging waves to be absorbed and the wire gage must be smaller than $\lambda_0/10$ of this maximum wavelength.

A plurality of individual absorbers are fixed to the supporting net 1 in spaced-apart relationship and provide a corresponding plurality of wave absorbing surfaces 10 to 26 facing the impinging waves. In the illustrated embodiment, the absorbers are shown to be fixed to the net by clamps 2 but obviously they could be attached to it by any other suitable fixing means, such as bonding, soldering or welding. As shown, the absorbing surfaces are of various regular and irregular shapes and dimensions none of which is smaller than $\lambda_0/10$ or longer than $10\lambda_0$ in any direction, however. The spacings $d_1$ to $d_5$ between the wave absorbing surfaces also vary and may be bounded by parallel, regularly or irregularly curved lines but always are within the above-indicated dimensions, the spaces between the absorbing surfaces causing strong wave diffusion and diffraction.

Any suitable absorber wall may be used for the absorbers arranged according to the present invention but thin resonance absorbers will usually be preferred. By way of example, useful absorbers include such as disclosed in U.S. Patents, Nos. 2,951,246, 2,951,247, 2,954,552, 2,923,934, 2,822,539 and 2,875,435, but even thinner ones have been disclosed by Ludwig Wesch, one of the joint inventors.

FIGS. 2 to 4 illustrate three embodiments of thin absorber walls fixed to supporting net 1. In FIG. 2, the absorber consists of a wave reflecting layer, such as a metal foil 28, a wave absorbing layer 27 carried by the reflecting base layer, and an infrared absorbing surface coating 29. In the embodiment of FIG. 3, the absorber has two oppositely facing wave absorbing layers 30, 32 carried by a reflecting base layer, layer 32 facing the supporting net 1 and layer 30 facing the free space whence a wave front impinges. The outer wave absorbing layer 30 also carries an infrared absorbing surface coating 29. FIG. 4 shows the wave absorber of FIG. 2 mounted on opposite sides of supporting net 1, with the infrared camouflaging coating 29 facing the free space while the inside absorber facing the object to be camouflaged has no such coating.

FIG. 5 illustrates one preferred arrangement of a camouflaging net in relation to an object 56 to be camouflaged. In this arrangement, the absorbers form different wave incidence angles in respect of the impinging wave front illustrated by impinging waves 42 to 51. In the illustrated embodiment, the absorbers are clamped to the net in the manner illustrated in FIG. 1 and the net is sufficiently stiff so that it may be bent out of a flat plane into a plurality of planes at other than right angles to the impinging wave front.

The operation of such a camouflaging net is illustrated in FIG. 5 by showing the wave paths of the impinging waves. Wave 42, for instance, is shown to be fully absorbed in an absorber tuned to its resonance. Impinging wave 43 is shown scattered on the wave absorbing surface according to the laws of optics. Waves 44, 46, 48 and 49 are deflected on the edge of the absorber, impinge on object 56 at an acute angle and are accordingly bounced back and forth several times between the reflecting surface of the object and the surface of the absorber. They are thus scattered and not reflected in the direction of incidence. These waves are scattered in different directions and thus may interfere with each other, thus producing an interference field behind the camouflaging net, wherein a large part of the waves will cancel each other. Waves 47 and 50 impinging upon absorbers 53 and 54, respectively, are scattered in the same manner as wave 43. Such an arrangement very effectively camouflages object 56, even in a rather wide frequency band of impinging waves.

Figure 13:
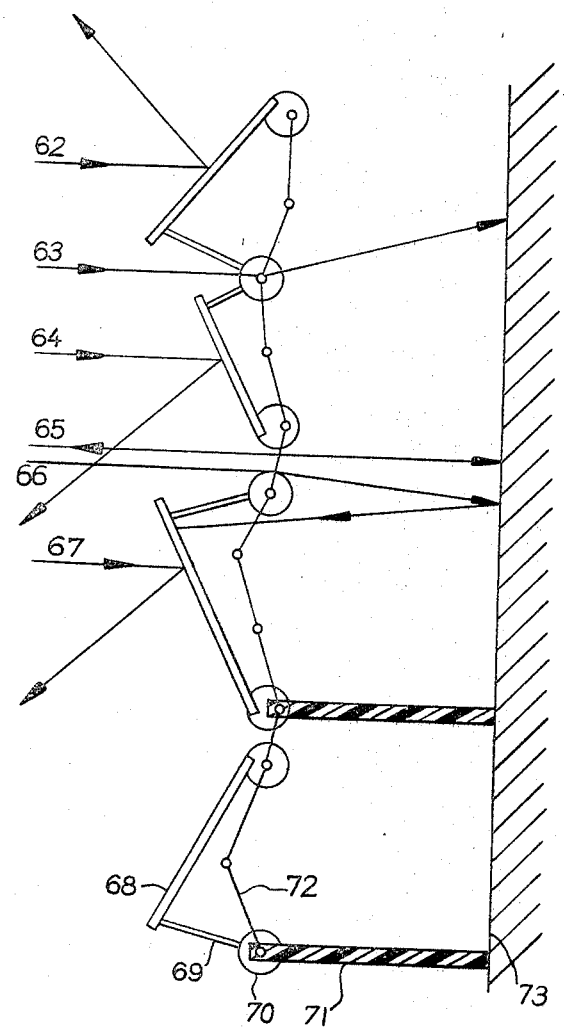
FIG. 13 schematically illustrates another arrangement of a camouflaging net over an object, similar to FIG. 5.

As shown in FIG. 13, substantially the same result is obtained with a net arranged more or less in a flat plane perpendicular to the wave front but with the absorbers fixed to the net at various angles so that the absorbers are not parallel to the net. In the illustrated embodiment, spacers 69 of non-reflective material, such as polyamides, polytetrafluorethylene and the like, are placed between the net 72 and the absorbers 68 at peripheral points thereof at one side of the absorbers while they are clamped to the net at an opposite side in the manner of FIG. 5, thereby spacing one side of the absorber at a different distance from the net than another side. Such a cantilever arrangement of an absorber on the net places its wave absorbing surface at an acute angle in respect of the impinging wave front 62, 64, 67. Thus, the impinging wave fronts are reflected at different angles, i.e. scattered, because the absorber surfaces 68 enclose different angles with the net 72 and the object 73 to be camouflaged.

The diffraction of the impinging waves 63, 65, 66 remains unchanged, as described in connection with FIG. 5.

The supporting net 72 itself may be supported on object 73 by means of spacers 71 of similar or like material as spacers 69.

For many camouflaging purposes, the effectiveness of the device will be increased if different types of absorbers are used on the net, including resonance and other types of wave absorbers well known to those skilled in the art. In many instances, it is necessary to extend the wave attenuation properties of the net to shorter than radar wavelengths, in which frequency range the usual radar wave absorbers are ineffective. For this purpose, an absorber such as shown in FIG. 6 will be very useful.

In this embodiment, the absorber 58 is fixed to the supporting net 57 by clamps 62, in the same manner as described hereinabove, the absorber defining a plurality of different sized apertures 60, 61 as well as narrow slits 59 stamped out of the absorber. Even short waves will be strongly diffracted at these apertures and slits. In this embodiment, the total area of apertures and/or slits must not exceed 40% of the total area of the absorbing surface.

In many instances, the effectiveness of the device will be increased by superimposing two light camouflaging nets in the manner illustrated in FIG. 7. Each of the nets is of the type described in connection with FIGS. 1, 5 or 13, and they are spaced apart a distance d. As shown, the absorbers of the two superimposed nets are staggered in relation to each other so that an absorber on the net closer to the object to be camouflaged will underlie an absorber interspace in the superimposed net while the interspaces in the lower net will register with the absorbers in the outer net. Any suitable spacer means may be used between the two nets to keep them at the desired distance d.

Since the wave attenuation maxima and minima of the nets vary, as will be explained hereinafter, the attenuation minima are reduced greatly with the use of two superimposed nets and the device becomes an effective camouflage in a wide frequency band wherein the attenuation does not fall below 10 db.

FIG. 8 is a graph illustrating the wave attenuation curve of a thin absorber effective in a narrow wave band. This absorber has a solid absorbing surface, i.e. it is not apertured, and an attenuation maximum at a wavelength of 3.15 cm. As can be seen, the attenuation rapidly decreases to below 10 db with a shortening or lengthening of the wave, falling to 10 db at a wavelength of about 2.12 cm. and about 4.2 cm., respectively.

Figure 9:
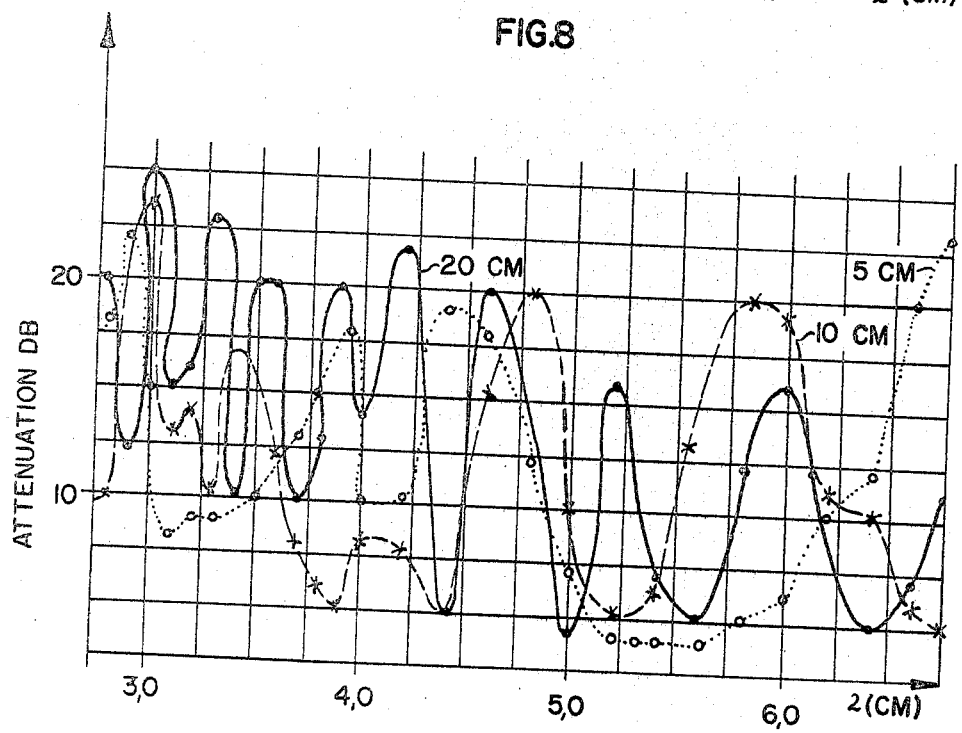

If a plurality of such absorbers are used on a camouflaging net, but whose absorbing surfaces may have a wave scattering configuration, as described hereinbelow, a plurality of wave attenuation maxima and minima will be produced within the frequency range of 3 cm. to 6 cm. waves, as illustrated in FIG. 9. As shown in FIG. 10, the position of the maxima and minima, as well as their extent, will depend on the distance of the camouflaging net from the object to be camouflaged. As the dotted curve indicates, relatively few attenuation maxima and minima appear with a small distance of 5 cm. When the distance of the net from the object is 10 cm. (see broken-line curve), the number of maxima and minima increases. Finally, at a distance of 20 cm. (curve in full line), there are a great number of maxima and minima. FIG. 9 thus illustrates the amazingly effective camouflaging properties of such a net under widely adaptable operating conditions.

FIGS. 7 and 10 show that differences in the spacing of the camouflaging net from the object to be camouflaged produces different attenuation curves. This results from the fact that the selected distance of the net from the object is chosen in relation to the wavelength of the impinging electromagnetic waves to be absorbed.

The different attenuation curves due to the different spacings of, say, 50, 100 or 200 mm. from the object are the result of the phenomenon that waves of different length pass through electrical paths of different length in a constant geometric distance between net and object, which leads either to an addition or to a subtraction of the impinging waves which are reflected and diffracted in different planes, i.e. the net and the object. Therefore, the number of attentuation curve maxima and minima increases with an increase in the net spacing from the object. This number also depends on the varying distances of the individual absorbing surfaces and the number of the attenuation maxima of the absorbers themselves since different spacings cause different diffraction of the impinging and reflected electromagnetic waves.

Figure 11:
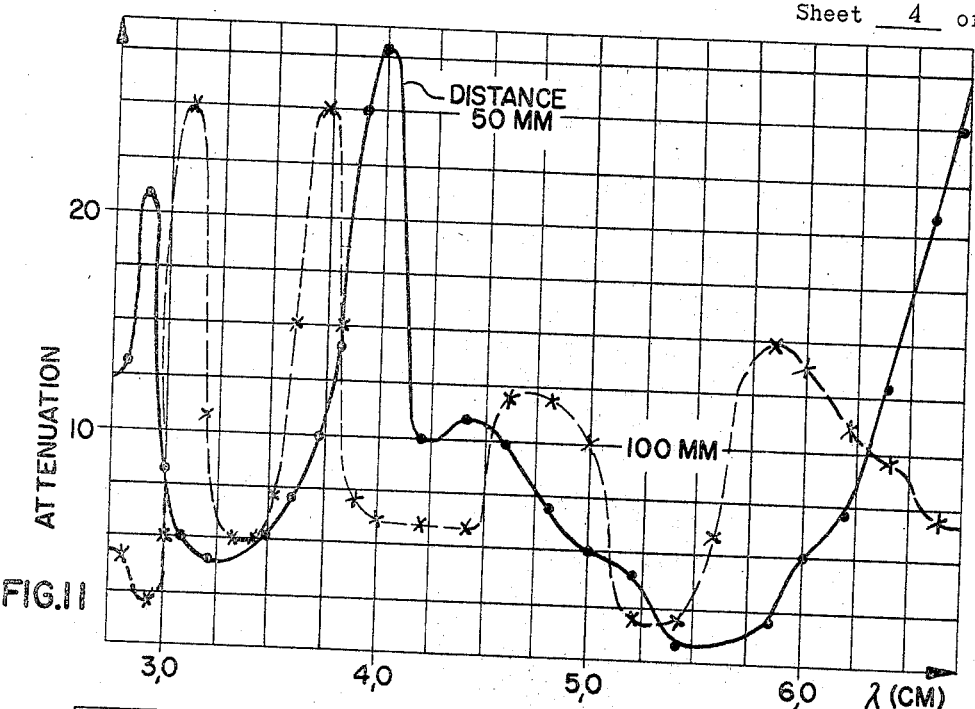

The attenuation curves of FIG. 11 show that the net will be effective even if it has accidentally been placed upside down, i.e. with the net and the metallic reflecting base of the absorbers facing the free space whence the impinging wave front emanates, while the absorbing surfaces face the object to be camouflaged. Even in this case, as the two curves taken at respective distances of 5 and 10 cm. of the net from the object indicate, there will be wave attenuation maxima and minima although not the entire frequency band is effectively attenuated. The maxima and minima are produced by the scattering of the diffracted waves behind the net (see waves 44, 46, 49 in FIG. 5) and the absorption of the difffracted waves on the absorbing surfaces facing the object. Another part of the wave front is diffused on the metallic surface upon which it impinges.

Of course, the above-described accidentally wrong placing of the net on the object to be camouflaged cannot occur with the embodiments of FIGS. 3 and 4 since, in these embodiments, a wave absorbing surface faces inwardly as well as outwardly.

Figure 12:
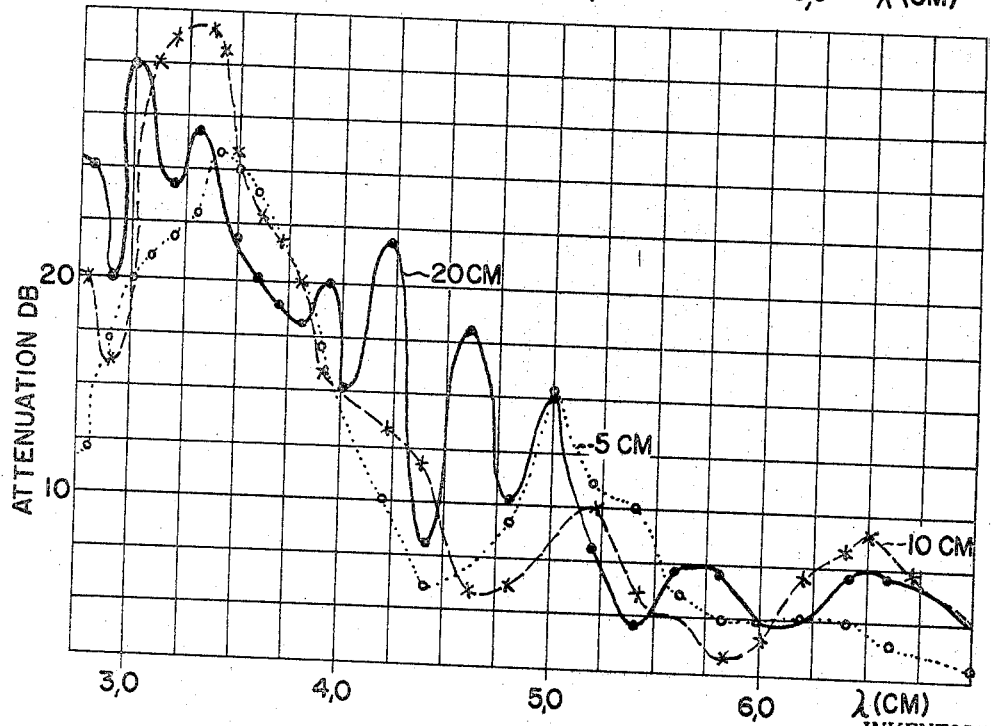

The outstanding effectiveness of these embodiments is illustrated by the attenuation curves in FIG. 12, in a wide band of 3 cm. to 6 cm. waves, and more particularly in the major frequencies of 3 cm. to 4.5 cm. At a distance of the net from the object, the attenuation maximum reaches more than 30 db and at a distance of 20 cm., it reaches 30 db. Even at a distance of 5 cm., the maximum is more than 25 db.

While the graphs show the outstanding effectiveness of the camouflaging net using only thin-walled absorbers with a single maximum in a narrow band (see FIG. 8), it is also possible further to increase the distribution of the attenuation maxima over the entire surface of the net by using individual absorbers with different attenuation characteristics, i.e. by using an absorber 10 having a maximum at one wavelength while some or all of the other absorbers have attenuation maxima at different wavelengths. The camouflaging effectiveness of such a net using only light, thin-walled absorbers, may be increased by two or three octaves.

As will be appreciated from a consideration of the attenuation curves in the graphs, which represent the wave attenuation of the same net placed at different distances from the object to be camouflaged, the spacing of the net from the object is of considerable importance. The spacing of the absorbing surfaces from the object may be varied even if the net itself is positioned parallel to the object. For instance, if the absorbers are slotted to provide apertures therein, the absorber portions at the slots may be bent out of the absorber plane and thus constitute spacers of various sizes which vary the distance of the absorber or absorber portions from the net and thus from the object. Separate spacers may also be used between the net and the absorbers and between the object and the net.

The attenuation curves illustrated in the graphs of FIGS. 9, 11 and 12 have been obtained, by way of example, with thin resonance absorbers whose attenuation curve, when used as a solid wall, is indicated in FIG. 8.

Such an absorber wall consists of three lacquer layers superposed on a metallic base sheet, the lacquer layers consisting of a Desmodur/Desmophen mixture containing conductive fillers, such as high-frequency iron powders and/or carbon. The Desmodur/Desmophen plastics are condensation products manufactured by Bayer, Leverkusen, Germany, which condense after application with the concurrent elimination of water. The Desmodur component is a diisocyanate. A considerable number of chemically different Desmophens are commercially available, the mechanical strength of the lacquer depending essentially on the nature of the latter component. The particular Desmodur component used herein consists of tolylene-diisocyanates or other diamines with polyols and Desmophen 1700 used herein an ester of adipic acid i.e. polyester with a small content of OH-groups.

The composition of the layers is as follows:

Layer I:

| | Percent by weight |
|---|---|
| Carbonyl L20 (produced by General Aniline and Film Corp.) | 55 |
| Desmophen 1700 | 25 |
| Glycerol as a plasticizer | 5 |
| Chloroparaffin, e.g. Chlorowax 70–S as a fire protective agent | 4 |
| A Mixture of 20% n-butylalcohol (1-butanol) and 80% solvent BGM (BASF-product consisting of a mixture of ethers of different glycols, specific weight 0.954) as a solvent | 11 |
| | 100 | and 10%, based on the weight of the above solution, of Desmodur.

The thickness of the layer is 0.9 mm., and for a wavelength of 3.2 cm., the relative dielectric constant $(k')=16.7$, the relative magnetic permeability $$(k_m')=1.07$$

the dielectric loss tangent (tan $\sigma_d$) =0.1 and the magnetic loss tangent (tan $\sigma_m$) =0.81.

Layer II:

| | Percent by weight |
|---|---|
| Carbonyl L20 | 66 |
| Desmophen 1700 | 16 |
| Glycerol | 5 |
| Chloroparaffin, e.g. Chlorowax 70–S | 4 |
| A mixture of 20% n-butylalcohol (1-butanol) and 80% solvent BGM (BASF-product consisting of a mixture of ethers of different glycols, specific weight 0.954) | 9 |
| | 100 | and 10%, based on the weight of the above solution, of Desmodur.

The thickness of layer II is 0.7 mm., and for a wavelength of 3.2 cm., $k'=10.2$, $k_m'=1.38$, tan $\sigma_d=0.091$, and tan $\sigma_m=0.55$.

Layer III:

| | Percent by weight |
|---|---|
| Carbon black | 3 |
| Magnesium-aluminum-silicate, e.g. Plastofit, a product of the Talkum-werke, Graz, Austria, as filler | 42 |
| Desmophen 1700 | 20 |
| Glycerol | 7 |
| Chloroparaffin | 6 |
| A mixture of 20% n-butylalcohol (1-butanol) and 80% solvent BGM (BASF-product consisting of a mixture of ethers of different glycols, specific weight 0.954) | 22 |
| | 100 | and 10%, based on the weight of the above solution, of Desmodur.

The thickness of layer III is 0.6 mm., and for a wavelength of 3.2 cm., $k'=4.1$, $k_m'=1.02$, tan $\sigma_d=0.028$, and tan $\sigma_m=0.109$.

Layer IV.—A metallic foil (aluminum) of a thickness of 0.01 mm.

The above four-layer thin resonance absorber wall was cut into individual walls of an area of 10 to 200 sq. cm. of different contours, such as shown in FIG. 1, and the individual walls were mounted at spacings from about 5 to 100 mm. on a polyamide net having 50 x 50 mm. meshes, by means of polyvinylchloride clamps.

If the spacing of such a net from a metal plate to be camouflaged is between 50 and 100 mm., the attenuation curves of FIG. 9 are obtained.

If the metallic side of the absorbers is turned towards the impinging wave front in the manner described hereinabove and the same spacing of 50 to 100 mm. from the object is maintained, the attenuation curves of FIG. 11 are obtained.

If the net has the structure of FIG. 4 and thus absorbs the impinging waves as well as the waves passing through the net and reflected from the object, the attenuation curves of FIG. 12 are obtained.

Actually, these attenuation curves may be obtained with various types of absorbers and the effective frequency band of the camouflage net is determined essentially by the attenuation maxima (see FIG. 8) of the absorbers used on the net.

It is also possible to impart wave scattering surface configurations to the wave absorbing surfaces, at taught, for instance, in U.S. Tiley Patent No. 2,464,006. Such surface configurations may be pressed or otherwise imparted to the absorbers in a well known manner, and they may include conical, frusto-conical, hemi-spherical or elliptical shapes. As is known, such surface structures further serve to scatter an impinging wave front and, as is also known, the depressions in the surface may be filled with any suitable material with a low dielectric constant, such as a thermoplastic synthetic resin or a plastic foam, if a flat surface appearance is desired.

It is preferred to provide the radar camouflaging nets described hereinabove with means to make them effective infrared camouflages. Infrared absorbing coatings for such purposes are well known to those skilled in the art and, if desired, such pigmented lacquers may also adapt the net to the surrounding area to provide camouflage against visible observation. Useful pigmentation will use the reflection curve of grass green to obtain good camouflaging results. Obviously, however, this pigmentation in the surface coating on the net and/or its absorbers may also seek to match the color of walls or other objects to be camouflaged. A differently colored surface coating may be provided on each side of the net so that the same may be used for different outdoor conditions to protect objects against visible observation. Different surface coatings may be used, if desired, on the individual wave absorbing surfaces to produce different degrees of reflection in the visible and infrared spectrum so that the entire net surface produces a mimicry effect of the surroundings.

It is also possible, particularly with the double-absorber nets illustrated in FIGS. 3 and 4, to associate gamma-ray and neutron reflecting and/or absorptive layers with the net. Such layers may be positioned, for instance, between the two electromagnetic wave absorber walls, or they may be superimposed on either side of the net. Such a camouflaging net is also effective as protection against atomic radiation.

It is further possible to protect the camouflaged object against heat by associated heat insulating layers with the net, such as plastic foams, which may be used in the same manner and with or without the atomic radiation protective layers.

We claim:

1. A radar camouflaging net for absorbing electromagnetic waves, comprising a supporting net having open meshes, a plurality of absorbers for said electromagnetic waves fixed to the supporting net in spaced-apart relationship and providing a corresponding plurality of wave absorbing surfaces, the dimension of said wave absorbing surfaces in any direction and the spacing between said wave absorbing surfaces in any direction being between $\lambda_0/10$ and $10\lambda_0$, the average spacing of all distances between the absorbing surfaces not exceeding about $5\lambda_0$, $\lambda_0$ being the average wavelength in free space of the waves to be absorbed in the range of centimeter wavelengths, the spacing between the wave absorbing surfaces being of varied magnitude and of different shapes.

2. The radar camouflaging net of claim 1, wherein the absorbers carry a surface coating for absorbing infrared radiation, whereby the net is effective also as an infrared camouflage.

3. The radar camouflaging net of claim 1, wherein the wave absorbing surfaces of the absorbers are so dimensioned and arranged to face the free space and away from the supporting net.

4. The radar camouflaging net of claim 1, wherein the wave absorbing surface of the absorbers are so dimensioned and arranged to face the supporting net and away from the free space.

5. The radar camouflaging net of claim 1, wherein the absorbers have two oppositely facing ones of said wave absorbing surfaces, one of said surfaces facing the supporting net and the other wave absorbing surface facing the free space.

6. The radar camouflaging net of claim 1, further comprising mechanical means for diffracting electromagnetic waves not absorbed by said absorbers.

7. The radar camouflaging net of claim 1, wherein said absorbers are fixed to the net and form different wave incidence angles in respect of the impinging wave front.

8. The radar camouflaging net of claim 1, wherein the resonance of the absorbers is tuned to different wavelengths within a frequency band of said electromagnetic waves to be absorbed, the absorber resonances being statistically distributed within said frequency band.

9. The radar camouflaging net of claim 1, wherein each of said wave absorbing surfaces define apertures, the apertures occupying up to 40% of the area of said surfaces.

10. The radar camouflaging net of claim 1, wherein said absorbers are thin resonance absorber walls.

References Cited

UNITED STATES PATENTS

| 2,000,806 | 5/1935 | White | 343—18 |
| 2,992,426 | 7/1961 | Borcherdt | 343—18 |
| 2,356,640 | 8/1944 | Wolff | 343—18 |

FOREIGN PATENTS

| 17,366 | 5/1956 | Germany. |

RODNEY D. BENNETT, *Primary Examiner.*

BRIAN L. RIBANDO, *Assistant Examiner.*